(12) United States Patent
Karaaslan et al.

(10) Patent No.: US 11,254,189 B2
(45) Date of Patent: Feb. 22, 2022

(54) ELECTRIC HEATING DEVICE

(71) Applicant: Valeo Systemes Thermiques, Le Mesnil Saint Denis (FR)

(72) Inventors: Serif Karaaslan, Le Mesnil Saint Denis (FR); Sébastien Colinet, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 186 days.

(21) Appl. No.: 16/332,268

(22) PCT Filed: Sep. 5, 2017

(86) PCT No.: PCT/FR2017/052344
§ 371 (c)(1),
(2) Date: Mar. 11, 2019

(87) PCT Pub. No.: WO2018/046835
PCT Pub. Date: Mar. 15, 2018

(65) Prior Publication Data
US 2019/0366804 A1 Dec. 5, 2019

(30) Foreign Application Priority Data
Sep. 9, 2016 (FR) ...................................... 1658437

(51) Int. Cl.
*B60H 1/22* (2006.01)
*F24H 3/04* (2022.01)
(Continued)

(52) U.S. Cl.
CPC ......... *B60H 1/2218* (2013.01); *B60H 1/2225* (2013.01); *F24H 3/0429* (2013.01);
(Continued)

(58) Field of Classification Search
CPC .. B60H 1/2218; B60H 1/2225; B60H 1/2227; F24H 3/0429; F24H 3/0432;
(Continued)

(56) References Cited

U.S. PATENT DOCUMENTS 7,200,327 B2 *  4/2007  Pierron ................ B60H 1/2225
                                                           165/148
7,234,950 B1    6/2007  Wickett
(Continued)

FOREIGN PATENT DOCUMENTS

EP    0135299 A2    3/1985
FR    2838599 A1    10/2003

OTHER PUBLICATIONS

International Search Report issued in corresponding Internation Patent Application No. PCT/FR2017/052344, dated Dec. 8, 2017 (6 pages).
(Continued)

*Primary Examiner* — Shawntina T Fuqua
(74) *Attorney, Agent, or Firm* — Osha Bergman Watanabe & Burton LLP

(57) ABSTRACT

An electric heating device may heat an air flow through a duct of a ventilation, heating and/or air-conditioning installation of an automotive vehicle. The heating device may include at least one heating module that is contained in a heating body. The heating body may include a housing for controlling and supplying electrical power to the at least one heating module. The housing may include, in its interior, a printed circuit board from which a power supply connector and a control connector protrude. The housing may also include a power supply opening such that the power supply connector emerges from the housing and a control opening such that the control connector emerges from the housing. The housing may include a skirt that protrudes in parallel to the control connector on the periphery of the control open-
(Continued)

ing. The skirt may be formed as a single part with the housing.

13 Claims, 3 Drawing Sheets

(51) Int. Cl.
    *F24H 9/1863*     (2022.01)
    *H05B 3/04*     (2006.01)
    *H05B 3/06*     (2006.01)

(52) U.S. Cl.
    CPC ............. *F24H 9/1872* (2013.01); *H05B 3/04* (2013.01); *H05B 3/06* (2013.01); *H05B 2203/016* (2013.01); *H05B 2203/02* (2013.01); *H05B 2203/023* (2013.01)

(58) Field of Classification Search
    CPC .... F24H 9/1872; F24H 3/0435; F24H 3/0405; F24H 3/0441; F24H 3/0447; F24H 3/0458; F24H 9/2071; H05B 3/06; H05B 3/04; H05B 2203/016; H05B 2203/02; H05B 2203/023; H05B 3/16; H05B 3/0042; H05B 3/0052; H05B 3/008; H05B 3/26; H05B 3/48; H05B 3/50; H05B 3/748; H05B 2203/022; H05B 2203/024; H05B 1/0236; H05B 1/028
    See application file for complete search history.

(56) References Cited

U.S. PATENT DOCUMENTS

| | | | |
|---|---|---|---|
| 2007/0084858 A1* | 4/2007 | Pierron | ................ B60H 1/2225 219/716 |
| 2011/0189877 A1 | 8/2011 | Svelnis et al. | |
| 2013/0161306 A1 | 6/2013 | Bohlender et al. | |

OTHER PUBLICATIONS

Written Opinion issued in corresponding International Patent Application No. PCT/FR2017/0522344, dated Dec. 8, 2017 (12 pages).

\* cited by examiner

ELECTRIC HEATING DEVICE

FIELD OF DISCLOSURE

The invention relates to an electric heating device for a motor vehicle and to the method for manufacturing said heating device. More particularly, the invention relates to an electric heating device integrated into a ventilation, heating and/or air conditioning installation of a motor vehicle.

BACKGROUND

A heating device usually comprises at least one heating module contained in a heating body. This heating body, for its part, comprises a control and electrical power supply housing of the heating module or modules, inside which housing a printed circuit may be placed. In this case, a power supply connector and a control connector project from the printed circuit and pass through the housing at a power supply opening and at a control opening, respectively. Connectors are connected to these power supply and control connectors to provide the electrical power supply and control the operation of the additional heating device.

With such a control connector, however, water penetration may occur in wet conditions. More precisely, water may penetrate into the control opening, between the connector and the housing.

SUMMARY OF DISCLOSURE

One of the objects of the present invention is therefore to overcome, at least partially, the drawbacks of the prior art, and to propose an improved heating device.

Accordingly, the present invention relates to an electric heating device for heating an air flow which passes through, notably, a conduit of a ventilation, heating and/or air conditioning installation of a motor vehicle, the heating device comprising at least one heating module contained in a heating body, said heating body comprising a control and electrical power supply housing of the at least one heating module, said housing containing itself a control module such as a printed circuit, from which at least one power supply connector and at least one control connector project, said housing also comprising a power supply opening such that the power supply connector emerges from said housing, and a control opening such that the control connector emerges from said housing, the housing comprising a skirt projecting parallel to the control connector on the periphery of the control opening, said skirt being made in one piece with the housing.

This skirt can provide a good seal at the control opening, notably when a dedicated connector is connected to the control connector. This is because the dedicated connector fits into, and fills, the space between the skirt and the control connector, thereby limiting the penetration of dust and water into the control opening. With such a skirt, an IP52 protection rating may be considered for the heating device.

According to one aspect of the invention, the space between the skirt and the control connector is between 0.5 and 1 mm.

According to another aspect of the invention, the skirt has a height of between 120% and 80% of the height of the control connector emerging from the housing.

According to another aspect of the invention, the skirt comprises an indentation on a portion of its periphery.

According to another aspect of the invention, the edge of the skirt is complementary to a shoulder of a dedicated connector designed to be connected to the control connector.

BRIEF DESCRIPTION OF DRAWINGS

Other characteristics and advantages of the invention will be more clearly apparent from a perusal of the following description, provided as an illustrative and non-limiting example, and from the appended drawings, of which.

Identical elements in the various figures have been given the same references.

DETAILED DESCRIPTION

The following embodiments are examples. Although the description refers to one or more embodiments, this does not necessarily mean that each reference concerns the same embodiment, or that the characteristics are applicable to a single embodiment only. Simple characteristics of different embodiments may also be combined or interchanged to provide other embodiments.

In the present description, some elements or parameters may be indexed, for example first element or second element, or first parameter and second parameter, or first criterion and second criterion, etc. In this case, this is a simple indexing for the purpose of differentiating and designating elements or parameters or criteria which are similar but not identical. This indexing does not imply that any element, parameter or criterion takes priority over another, and such designations may easily be interchanged without departing from the scope of the present invention. Furthermore, this indexing does not imply any ordering, in time for example, for the estimation of any one or other criterion.

In the following description, reference will be made to an orientation based on the longitudinal, vertical and transverse axes, as defined arbitrarily by the triple coordinate system L, V, T shown in FIGS. 1 to 4. The choice of the names of these axes does not limit the possible orientation of the device in its application to a motor vehicle.

Figure 1:
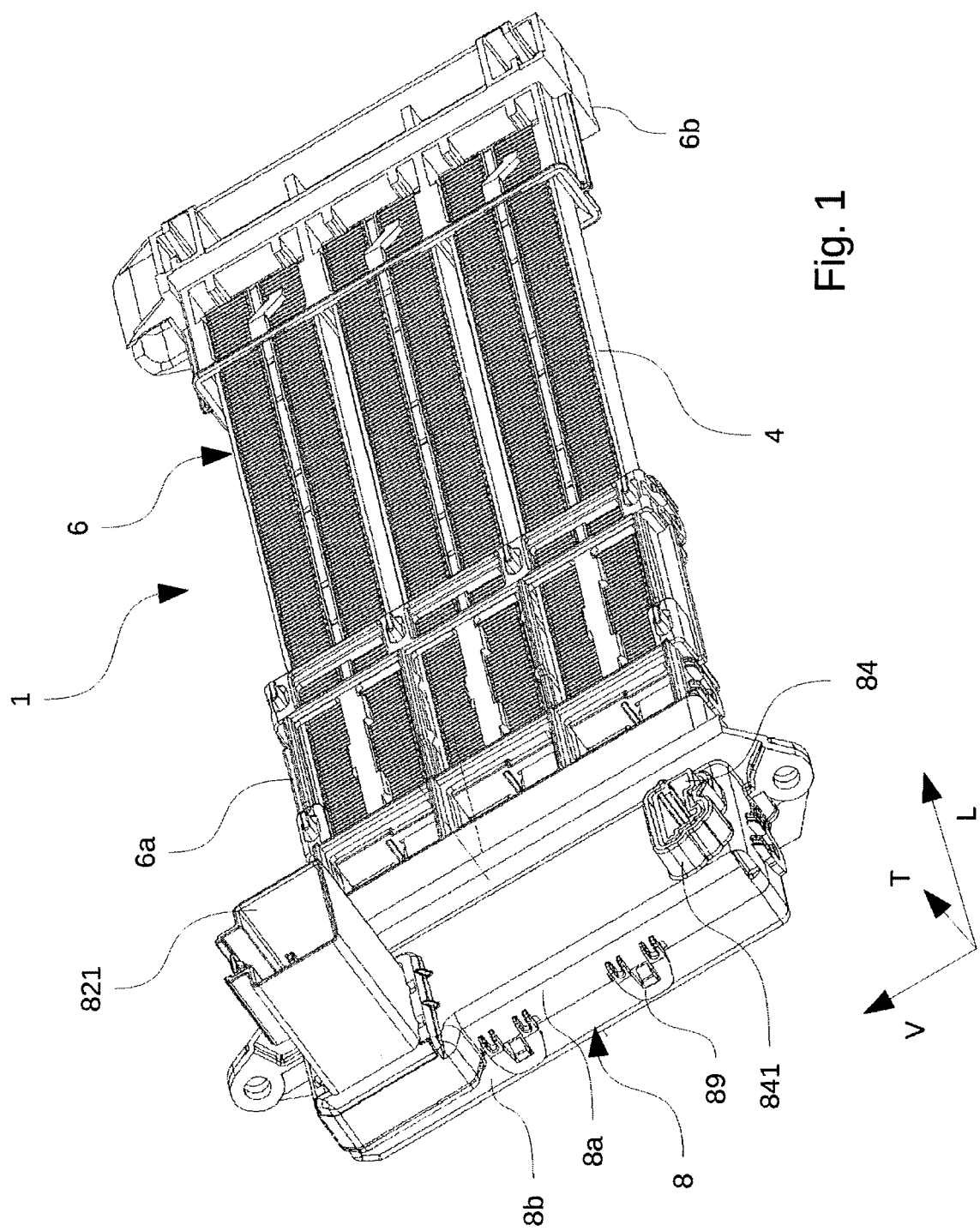
FIG. 1 shows a schematic perspective representation of an additional heating device.

As shown in FIG. 1, the heating device 1 comprises at least one heating module 4, configured to convert an electric current into thermal energy, contained in a heating body 6.

The heating device 1 is capable of being housed in an air circulation conduit of a ventilation, heating and/or air conditioning installation (referred to as an HVAC, the English abbreviation for Heating, Ventilation and Air-Conditioning), in order to convert the electrical energy drawn from the vehicle into thermal energy and to return it to the air passing through said HVAC.

The HVAC is not shown here, but it will be evident that a main conduit of this HVAC comprises, in a conventional manner, an opening formed in the wall for the insertion of the additional heating device.

The heating module 4 is positioned longitudinally along the longitudinal axis L, in the heating body 6. The heating body 6 comprises, at one end of the heating module 4, a first end 6*a* comprising a control and power supply housing 8 of the heating module 4. At the opposite end of the heating module 4, the heating body 6 comprises a second end 6b. In the example shown in FIG. 1, the first 6a and second 6b ends are independent, but it is entirely possible to imagine an embodiment in which the first 6a and second 6b ends are interconnected by cross-pieces so as to frame the heating module 4 completely.

The heating body 6 is preferably made of a plastic material, for example polypropylene or polyamide, filled with glass fibers. The housing 8 may be made of a material which is more heat-resistant than the rest of the heating body 6. This is because the electrical connections of the heating modules 4 are made at said housing 8, and it may therefore be subjected to high temperatures.

The heating module 4 may, notably, comprise:
at least two conductor assemblies, formed by:
  a conductive electrode extended longitudinally by a free electrode end, said free electrode end being connectable to the electrical power source of the vehicle at the housing 8,
  a retaining plate that may be made of a metallic material such as aluminum, and
  an interlayer sandwiched and retained between the conductive electrode and the retaining plate; said interlayer may, notably, be an accordion-folded metal strip and may be placed between the conductive electrode and the retaining plate, so that an air flow can pass through said interlayer,
at least one positive temperature coefficient (PTC) ceramic, the ceramic being sandwiched between two conductor assemblies.

Figure 2:
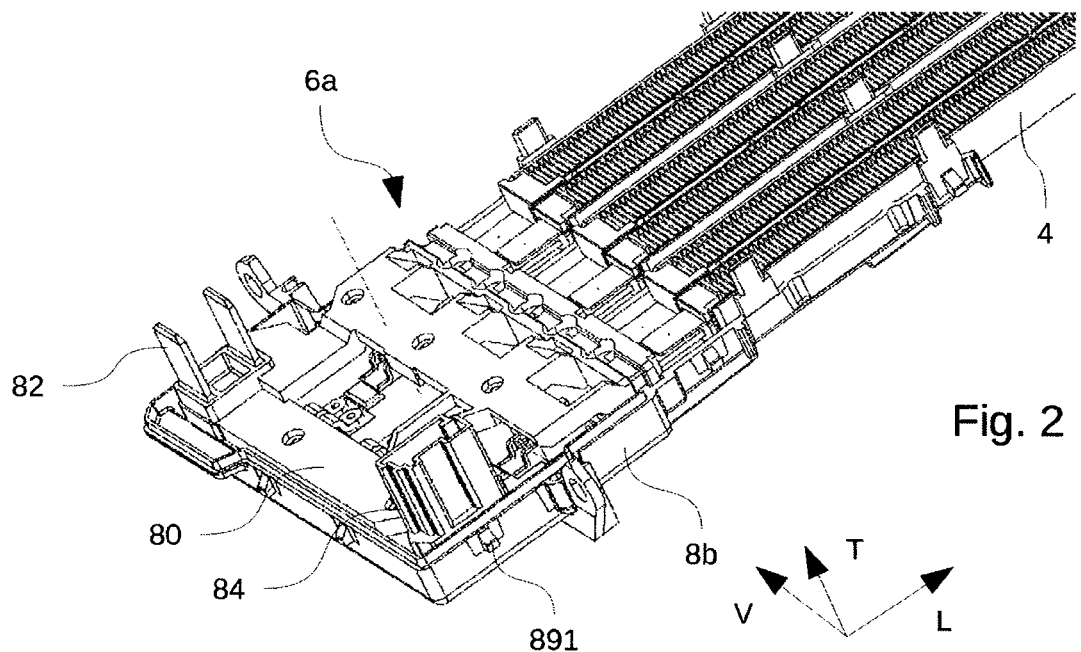
FIG. 2 shows a schematic perspective representation of a lower half of a control and power supply housing and its contents.

As shown in FIG. 2, the housing 8 contains a printed circuit 80 from which a power supply connector 82 and a control connector 84 project along the transverse axis T.

This printed circuit 80 enables the heating modules 4 to be supplied with electricity by connection to an electricity source at the power supply connector 82, and enables the operation of the heating modules 4 to be controlled by either controlling or not controlling their power supply as well as their heating intensity by means of a connection to, for example, an electronic control unit of the motor vehicle which transmits its commands via the control connector 84.

Figure 3:
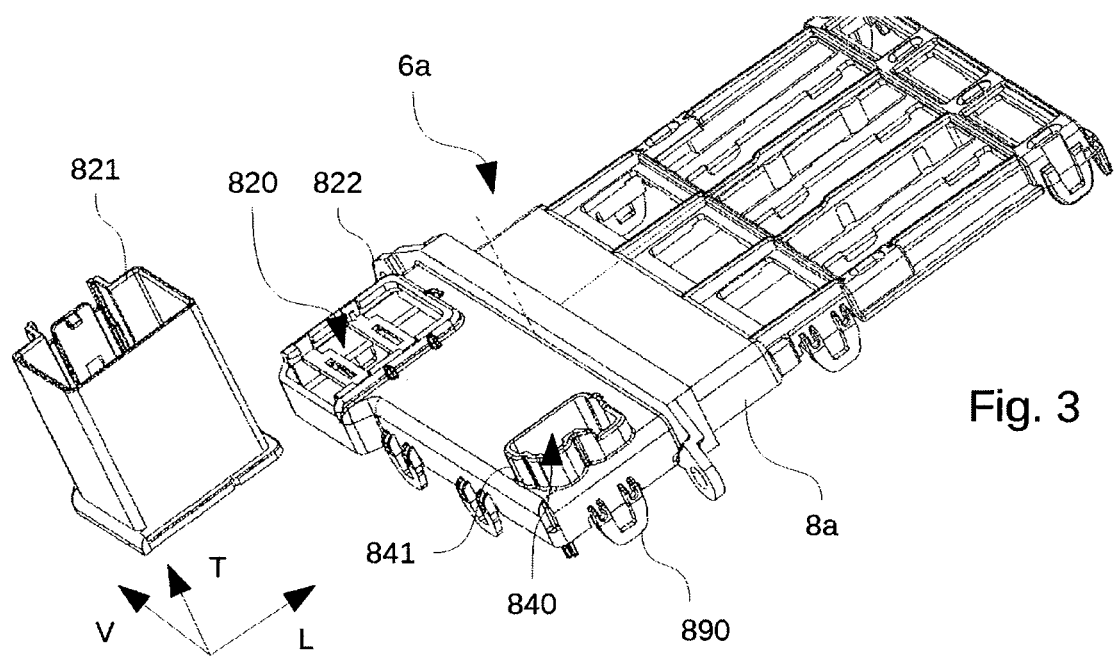
FIG. 3 shows a schematic perspective representation of an upper half of a control and power supply housing.

As shown in greater detail in FIG. 3, the housing 8 comprises a power supply opening 820 such that the power supply connector 82 emerges from said housing 8, and a control opening 840 such that the control connector 84 also emerges from said housing 8.

The housing 8 may, notably, comprise, on the periphery of the power supply opening 820, a groove 822 into which a sleeve 821 is made to slide, for example along the longitudinal axis L as shown in FIG. 3. The sleeve 821 extends along the transverse axis T, and the power supply connector 82 is placed inside said sleeve 821. This sleeve 821 provides, notably, a good seal at the power supply opening 820.

The housing 8 comprises a skirt 841 projecting parallel to the control connector 84, that is to say extending along the transverse axis T, on the periphery of the control opening 840. The skirt 841 is made in one piece with the housing 8. This skirt 841 can provide a good seal at the control opening 840, notably when a dedicated connector is connected to the control connector. This is because this dedicated connector fits into, and fills, the space between the skirt 841 and the control connector 84, thereby limiting the penetration of dust and water into the control opening 840. With such a skirt 841, an IP52 protection rating may be considered for the heating device 1.

Figure 4:
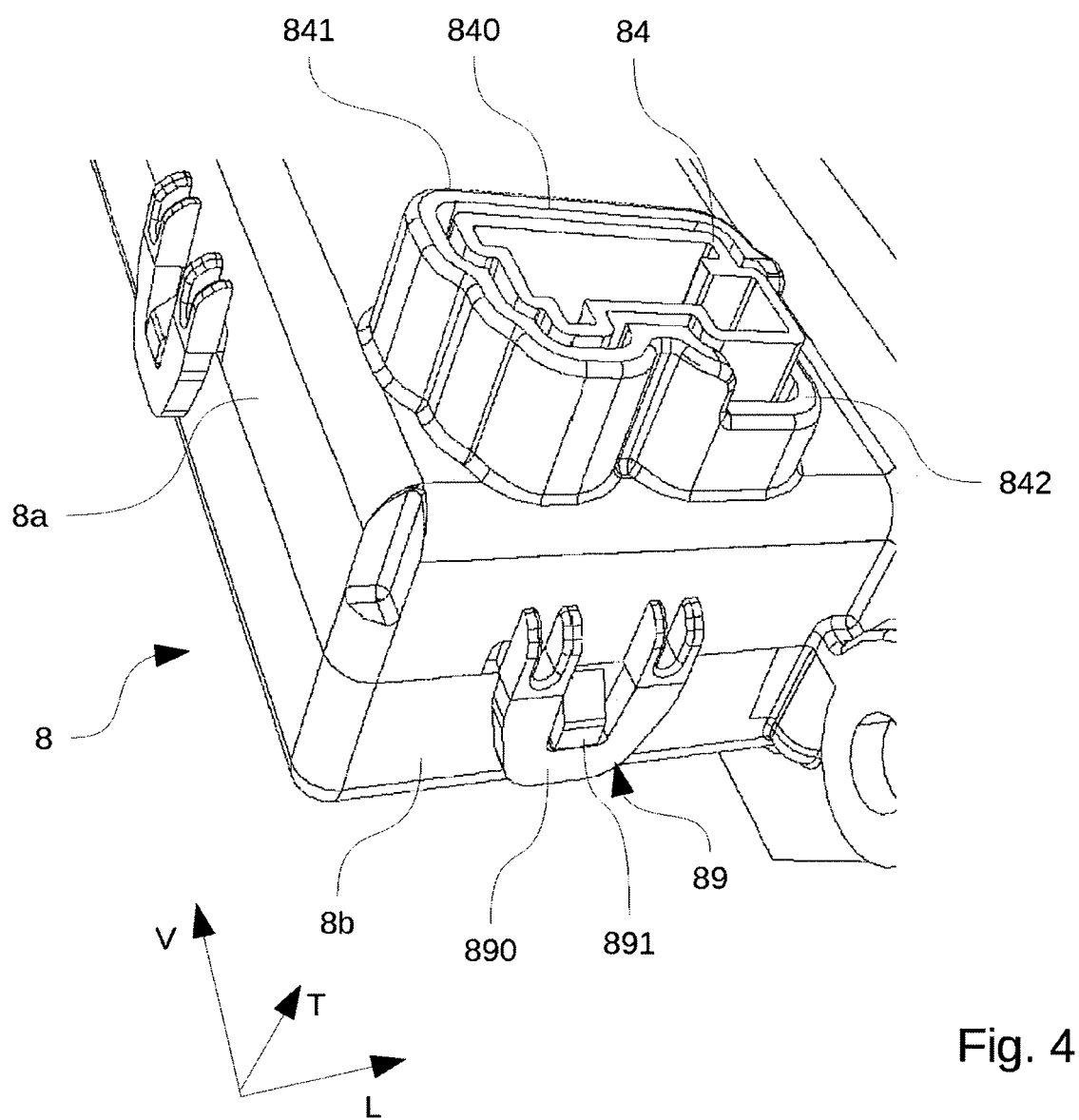
FIG. 4 shows a perspective representation of a control opening.

The skirt 841 and the control opening 840 are visible in greater detail in FIG. 4. The space between the skirt 841 and the control connector 84 is between 0.5 and 1 mm. Preferably, this space is 0.7 mm, corresponding to the thickness of the outer wall of the dedicated connector designed to be connected to the control connector 84. This makes it possible to limit the play between the dedicated connector and the skirt 841, thereby reinforcing the seal between these elements.

Also for the purpose of improving the seal, the skirt 841 preferably has a height of between 120% and 80% of the height of the control connector 84 emerging from the housing 8.

The edge of the skirt 841 may, notably, be complementary to a shoulder of a dedicated connector designed to be connected to the control connector 84. This shoulder covers, or may come into contact with, the edge of the skirt 841, and can provide a good seal.

The skirt 841 may also comprise an indentation 842 on a portion of its periphery. This indentation 842 makes it possible to grasp the dedicated connector designed to be connected to the control connector 84, in order to disconnect it if necessary.

The housing 8 and the first end 6a of the heating body 6 may, notably, be composed of an upper half-housing 8a and a lower half-housing 8b, which are separated along a plane comprising the longitudinal axis L and the vertical axis V. The term "upper half-housing 8a" is used here for the half-housing comprising the power supply opening 820 and the control opening 840, and the term "lower half-housing 8b" is used for the half-housing not comprising the power supply opening 820 and the control opening 840. The upper half-housing 8a and the lower half-housing 8b are interconnected by retaining means, such as screws or elastically deformable fastenings 89, as shown in FIGS. 1 and 4. Here, these elastically deformable fastenings 89 comprise an elastic loop 890 fixed to the upper half-housing 8a (visible in FIG. 2) which interacts with a stud 891 fixed to the lower half-housing 8b (visible in FIG. 3).

Evidently, therefore, because of its structure, and notably because of the presence of the skirt 841, the heating device 1 has a good seal at its control opening.

The invention claimed is:

1. An electric heating device for heating an air flow passing through a conduit of a ventilation, heating and/or air conditioning installation of a motor vehicle, the electric heating device comprising:
at least one heating module contained in a heating body,
the heating body comprising a control and power supply housing of the at least one heating module, the control and power supply housing containing a printed circuit from which at least one power supply connector and at least one control connector project,
the control and power supply housing further comprising:
  a power supply opening such that the power supply connector emerges from the control and power supply housing and a control opening such that the control connector emerges from the control and power supply housing, and
  a skirt projecting parallel to the control connector on a periphery of the control opening,
  the skirt being made in one piece with the control and power supply housing,
  wherein the skirt has a height of between 120% and 80% of a height of the control connector emerging from the control and power supply housing.

2. The electric heating device as claimed in claim 1, wherein a space between the skirt and the control connector is between 0.5 and 1 mm.

3. The electric heating device as claimed in claim 1, wherein the skirt comprises an indentation on a portion of a periphery of the skirt.

4. The electric heating device as claimed in claim 1, wherein a edge of the skirt is complementary to a shoulder of a dedicated connector connected to the control connector.

5. An electric heating device for heating an air flow passing through a conduit of a ventilation, heating and/or air conditioning installation of a motor vehicle, the electric heating device comprising:
   at least one heating module contained in a heating body, the heating body comprising a control and power supply housing of the at least one heating module, the control and power supply housing comprising:
      a printed circuit from which at least one power supply connector and at least one control connector project,
      a power supply opening through which the power supply connector emerges from the control and power supply housing and a control opening through which the control connector emerges from the control and power supply housing, and
      a skirt projecting parallel to the control connector on a periphery of the control opening, the skirt being made in one piece with the control and power supply housing,
   wherein a dedicated connector that is connected to the control connector fits into, and fills, a space between the skirt and the control connector, and
   wherein the skirt has a height of between 120% and 80% of a height of the control connector emerging from the control and power supply housing.

6. An electric heating device for heating an air flow passing through a conduit of a ventilation, heating and/or air conditioning installation of a motor vehicle, the electric heating device comprising:
   at least one heating module contained in a heating body, the at least one heating module being positioned longitudinally along a longitudinal axis of the heating body, the heating body comprising a control and power supply housing of the at least one heating module,
   the control and power supply housing comprising:
      a power supply opening such that the power supply connector emerges from the control and power supply housing and a control opening such that the control connector emerges from the control and power supply housing, and
      a skirt projecting parallel to the control connector on a periphery of the control opening, the skirt being made in one piece with the control and power supply housing, wherein the skirt has a height of between 120% and 80% of a height of the control connector emerging from the control and power supply housing
   the at least one heating module comprising at least two conductor assemblies, formed by:
      a conductive electrode extended longitudinally by a free electrode end, the free electrode end being connectable to an electrical power source of the motor vehicle at the control and power supply housing,
      a retaining plate made of a metallic material, and
      an interlayer sandwiched and retained between the conductive electrode and the retaining plate, wherein the interlayer is an accordion-folded metal strip placed between the conductive electrode and the retaining plate, so that an air flow can pass through the interlayer.

7. The electric heating device as claimed in claim 4, the shoulder covers, or comes into contact with, the edge of the skirt.

8. The electric heating device as claimed in claim 1, wherein the control and power supply housing is made of a material that is more heat-resistant than the rest of the heating body.

9. The electric heating device as claimed in claim 8, wherein the rest of the heating body is made of a plastic material filled with glass fibers.

10. The electric heating device as claimed in claim 1, wherein the control and power supply housing comprises a groove on a periphery of the power supply opening.

11. The electric heating device as claimed in claim 10, further comprising a sleeve slidably disposed in the groove and the power supply connector is placed inside the sleeve.

12. The electric heating device as claimed in claim 1, wherein a first end of the heating body and the control and power supply housing are composed of an upper half-housing and a lower half-housing, wherein the upper half-housing comprises the power supply opening and the control opening, and wherein the lower half-housing does not comprise the power supply opening and the control opening.

13. The electric heating device as claimed in claim 12, further comprising an elastic loop fixed to the upper half-housing and a stud fixed to the lower half-housing, wherein the elastic loop interacts with the stud to interconnect the upper half-housing and the lower half-housing.

* * * * *